E. C. SMITH.
HAY RAKE.
APPLICATION FILED FEB. 1, 1909.
946,883.
Patented Jan. 18, 1910.
4 SHEETS—SHEET 1.
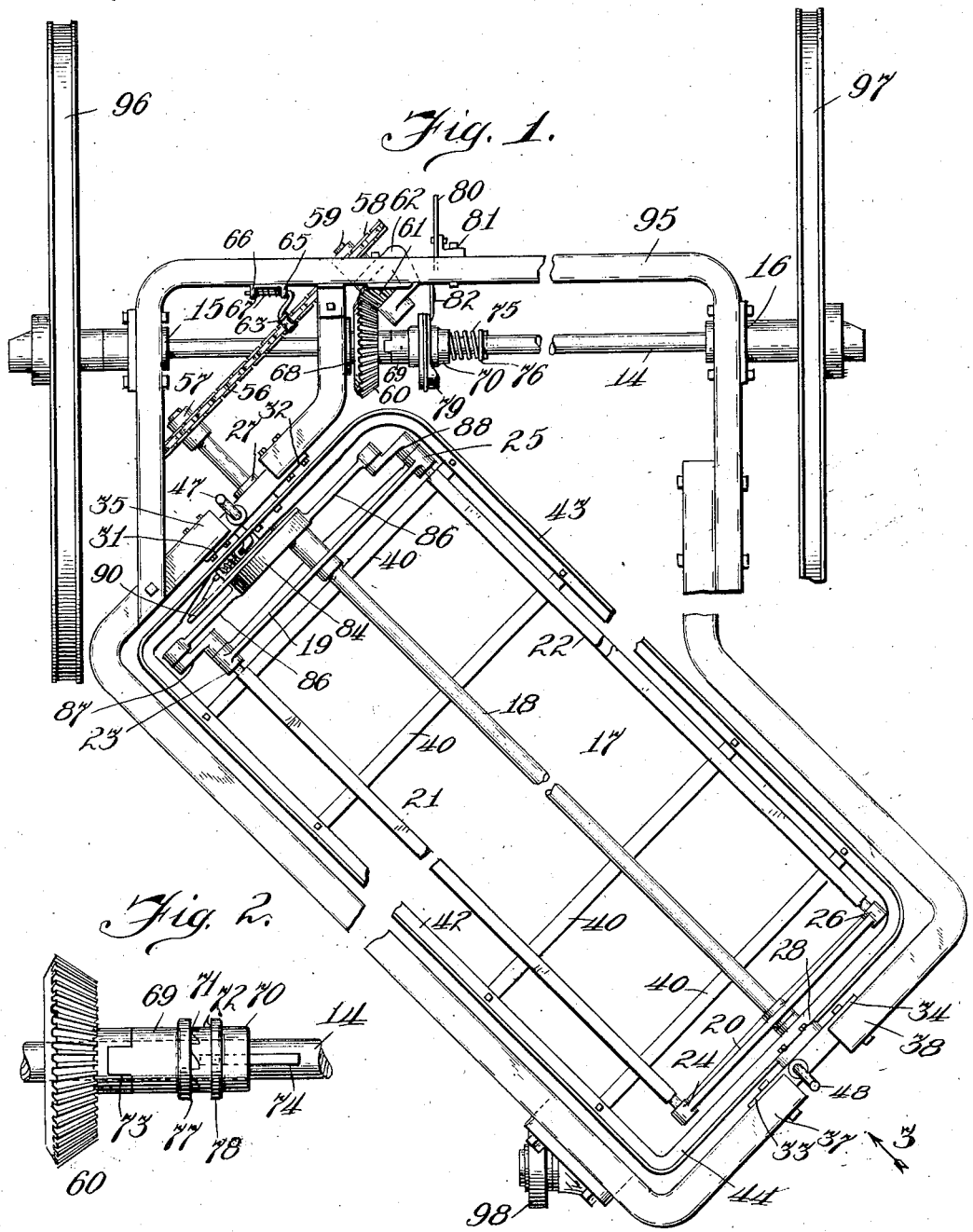
Witnesses
Milton Lenoir
E. M. Klatcher
Inventor
Ernest C. Smith.
By Gillson & Gillson
Attorneys.

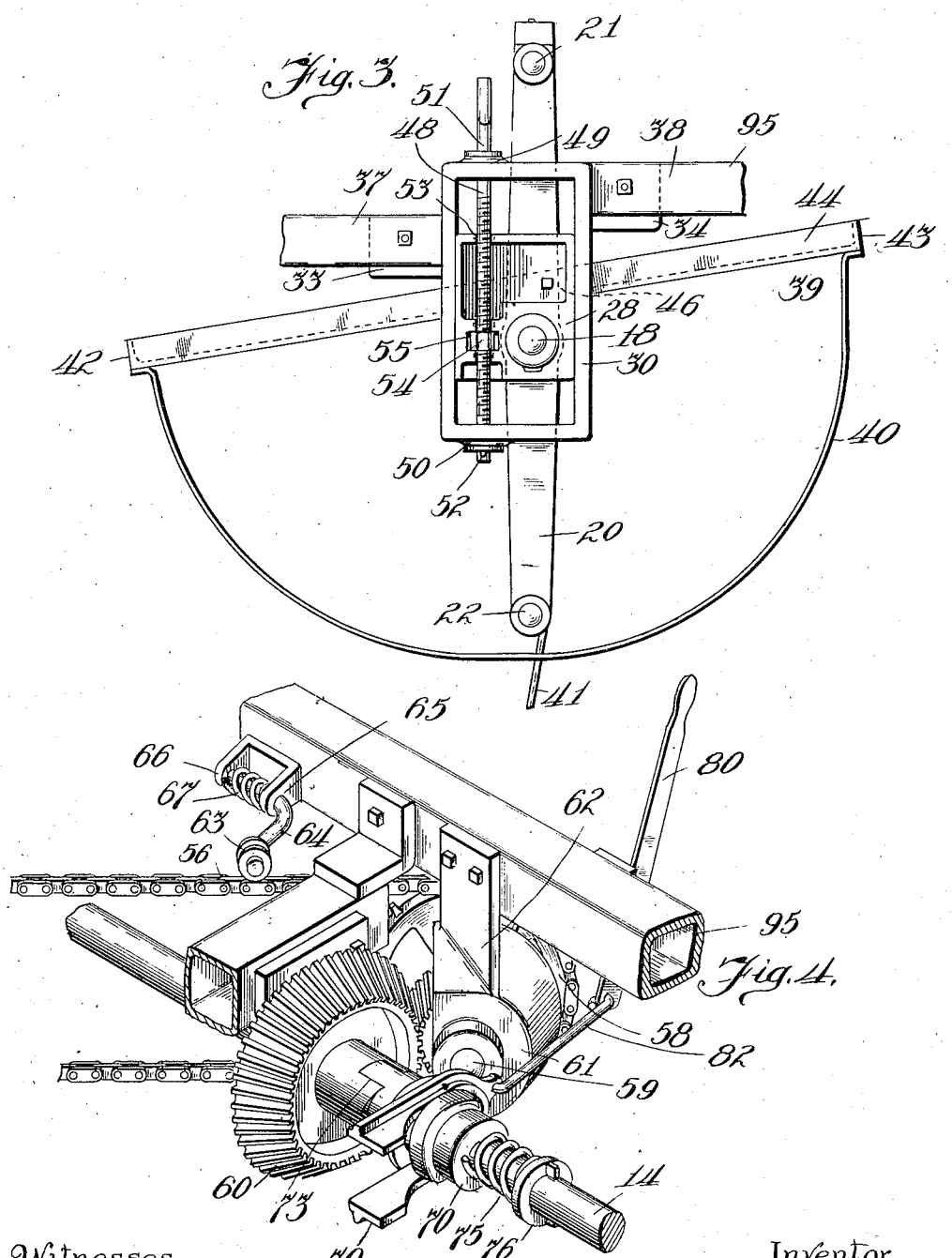

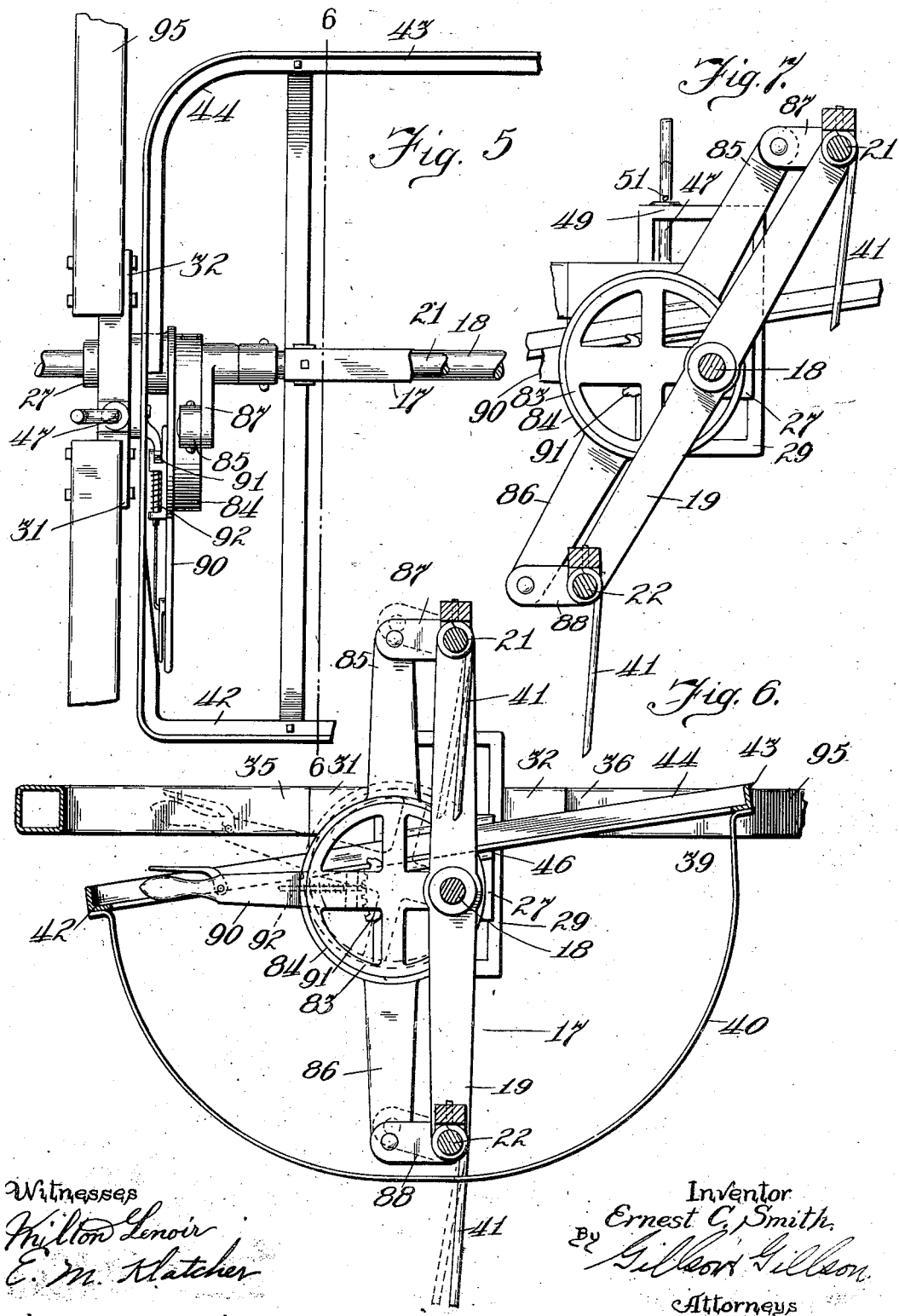

E. C. SMITH.
HAY RAKE.
APPLICATION FILED FEB. 1, 1909.
946,883.
Patented Jan. 18, 1910.
4 SHEETS—SHEET 4.
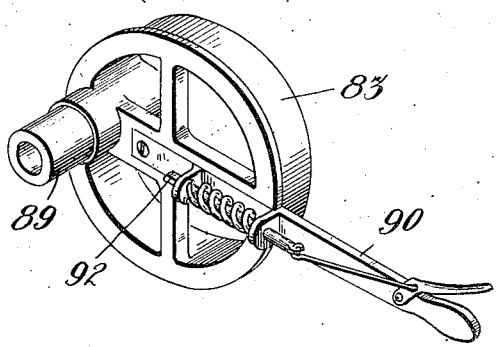
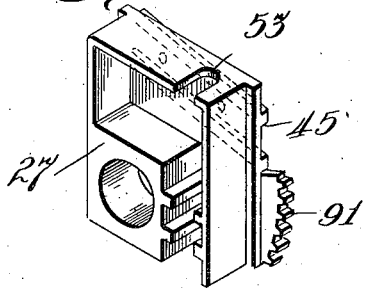
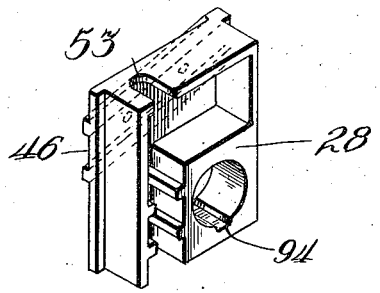
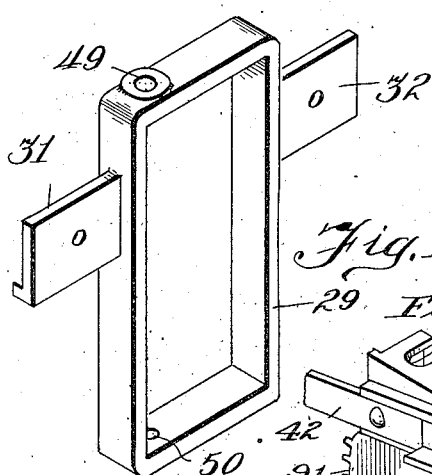
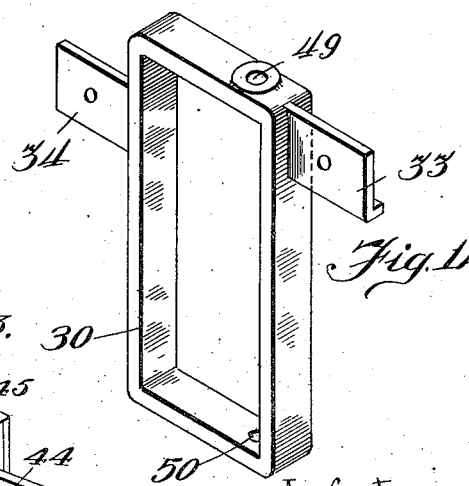
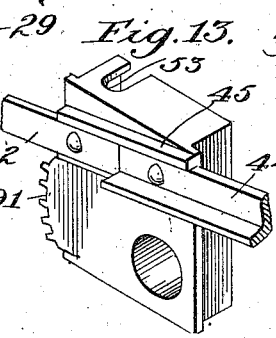
Witnesses
Milton Lenoir
E. M. Klatcher
Inventor
Ernest C. Smith,
By
Gillson & Gillson
Attorneys.

UNITED STATES PATENT OFFICE.

ERNEST C. SMITH, OF CANTON, ILLINOIS.

HAY-RAKE.

946,883.  Specification of Letters Patent.  Patented Jan. 18, 1910.

Application filed February 1, 1909. Serial No. 475,475.

*To all whom it may concern:*

Be it known that I, ERNEST C. SMITH, a citizen of the United States, and resident of Canton, county of Fulton, and State of Illinois, have invented certain new and useful Improvements in Hay-Rakes, of which the following is a specification, and which are illustrated in the accompanying drawings, forming a part thereof.

The invention relates to hay-raking machines of that form wherein the gathering of hay is effected by means of a rotatable rake member mounted for movement over the ground in a wheeled supporting frame.

The object of the invention is to provide a rake which shall be of improved construction, whereby its parts are adapted for adjustment to suit the various conditions of use without interfering with the capacity of the rake for gathering hay in considerable quantities.

The invention is exemplified in the structure to be hereinafter described, and illustrated in the accompanying drawings, in which—

Figure 1 is a plan view of a rake embodying the features of the invention; Fig. 2 is a detail plan view of certain parts of a clutch and driving gear employed upon the machine; Fig. 3 is a detail end elevation of the machine viewed in the direction of the arrow on Fig. 1 and there designated by the numeral 3; Fig. 4 is a perspective view illustrating details of the clutch and driving gear mechanisms of the machine; Fig. 5 is a detail plan view of the machine; Fig. 6 is a detail cross-sectional view taken on the line 6—6 of Fig. 5; Fig. 7 is similar to a detail of Fig. 6 but illustrates the parts of the machine in a different position of movement; Figs. 8, 9, 10, 11 and 12 are perspective views illustrating details of the construction separated from other parts; and Fig. 13 shows in perspective the bearing block illustrated in Fig. 9 having the end of the stripper frame secured thereto.

The machine illustrated in the drawings is of the general type commonly termed side-delivery rakes, and is of that form of side-delivery rake wherein the rotatable rake member takes the form of a reel carrying rake-heads which sweep the ground during the rotation of the reel in a direction inclined to the direction of movement of the machine.

The frame of the machine is generally designated by the numeral 95, and, as shown, is a horizontal open structure of irregular shape, supported by carrying wheels 96, 97 and 98. The carrying wheels, designated 96 and 97, are traction wheels of the form adapted to drive the operative parts of the rake as the machine is drawn over the ground. For this purpose they are mounted in the usual way upon the opposite ends of a rotating axle 14, journaled at 15, 16, in the side members of the frame 95 adjacent its forward end. The carrying wheel 98 is a caster wheel of ordinary construction designed to support the outer rear end of the frame 95.

The raking reel is generally designated by the numeral 17. It comprises a reel shaft 18 extending at an angle to the line of draft of the machine, and reel arms 19, 20, fixed to the shaft 18 adjacent its ends. Rake-bars 21 and 22, extending throughout the entire length of the reel 17, are rotatably mounted in the ends of the reel arms 19, 20, as at 23, 24, and 25, 26, respectively. Provision is made for vertically adjusting the reel 17. To this end the reel shaft 18 is journaled in bearing blocks 27, 28, each having an adjustable vertical sliding movement in bracket members, as 29, 30, embodied in the frame structure 95. The bearing blocks 27, 28, and the bracket members 29, 30, are illustrated, respectively, in Figs. 9, 10, 11 and 12 of the drawings.

As shown, each of the bracket members 29, 30, takes the form of a vertically extended open rectangular frame, the sides of the frame constituting ways on which the bearing blocks 27, 28, slide. These bracket members are incorporated in the structure of the frame 95, preferably by forming on opposite sides of the brackets lugs or ears, as 31, 32, 33, 34, to which the ends 35, 36, 37, 38, of members of the frame 95 are bolted or otherwise secured, as is most clearly shown in Figs. 1 and 3.

Preferably those parts of the reel shaft 18 which turn within the bearing blocks 27, 28, are inclosed by sleeves or bushings designated, respectively, 89 and 92. The bushing 92 is fixed against rotation in the bearing block 28, as by being provided with a lug 93 which fits a socket 94 formed in the bearing block 28, Fig. 10.

A stripper frame, generally designated 39, is provided for clearing the teeth, as 41, of the rake-bars 21, 22. This stripper frame comprises a plurality of bars 40, bent to inverted bale form, and the rake-teeth 41 operate between these bars. As shown, the ends of the bars 40 are secured to the side members 42, 43, of an open rectangular frame 44, which incloses the reel 17 and occupies a position slightly inclined from the horizontal, as most clearly illustrated in Figs. 3 and 6 of the drawings. In order that the stripper 39 may always occupy the same vertical position with respect to the reel 17, provision is preferably made for its vertical adjustment, and as shown it is carried by the bearing blocks 27, 28, the ends of the frame 44 being bolted to the inside faces of these bearing blocks, as at 45, 46.

Vertical adjustment of the bearing blocks 27, 28, simultaneously raises or lowers the reel 17 and stripper frame 39. For manually effecting this adjustment threaded crank shafts 47, 48, are preferably provided. As shown, these crank shafts extend vertically through the bracket members 29, 30, respectively, being journaled adjacent their ends in the upper and lower cross-members of the brackets, as at 49, 50, Fig. 3, and fixed against longitudinal movement therein by means of cotter pins 51, 52. Each of the bearing blocks 27, 28, is suitably recessed, as at 53, for receiving the corresponding crank shafts 47, 48, and operative connection between the crank shafts and the bearing blocks is preferably provided through threaded nuts, as 54. These nuts run on the crank shafts and lay in pockets, as 55, formed in the bearing blocks, whereby the nuts are fixed against rotation and the bearing blocks are compelled to move vertically with the nuts when the crank shafts 47, 48, are rotated.

The reel shaft 18 may be driven from the rotating axle 14 in any convenient manner not inconsistent with the vertical adjustment of the reel in the manner just described. Preferably a sprocket chain 56, turning over a sprocket wheel 57, mounted on the inner end of the reel shaft 18, and a sprocket wheel 58, mounted upon a countershaft 59, having gear connection 60, 61, with the rotating axle 14, is employed for this purpose. As shown, the countershaft 59 is supported in a position of parallelism with the reel shaft 18 by being journaled in a bracket 62, depending from the front cross-member of the frame 95 of the machine. The sprocket chain 56 most conveniently straddles the rotating axle 14, and, as shown, is of sufficient length to admit of a relative vertical movement between the sprocket wheels 57, 58, incident to the vertical adjustment of the reel 17.

To insure that the sprocket chain 56 will always run sufficiently tight to remain in operative engagement with the sprocket wheels 57, 58, a yielding slack take-up device bearing upon the chain is preferably provided. As shown, this take-up device comprises a roller 63, which runs upon the upper turn of the chain 56. This roller is mounted upon the end of a crank-arm 64, having its stem journaled in bracket lugs 65, 66, secured to the front cross-member of the frame 95. A spring 67, coiled about the stem of the crank-arm 64 between the bracket lugs 65, 66, rotatably reacts upon the crank-arm 64 to cause the roller 63 to yieldingly bear downwardly upon the sprocket chain 56.

Clutch connection, most clearly illustrated in Fig. 4 of the drawings, is provided between the rotating axle 14 and the gear 60 for controlling the operation of the reel 17. Preferably the gear 60 is loosely mounted upon the rotating axle 14, and is fixed against longitudinal movement thereon in one direction by means of a bracket member 68, which depends from the frame 95.

As shown, the gear 60 has its hub extended in one direction by means of a sleeve 69, interlocked with the hub of the gear at 73 (Fig. 2) to rotate therewith. This sleeve has a clutch face 71. A movable clutch member 70 having a splined connection 74 with the rotating axle 14 is mounted on the axle in front of the clutch face 71 of the part 69 and has a complementarily formed clutch face 72.

A spring 75, coiled about the rotating axle 14, reacts between the back of the movable clutch member 70 and a collar 76 fixed to the axle 14, to normally maintain the fixed and movable clutch members 69, 70, in operative connection.

For separating the clutch members 69 and 70, they are provided, respectively, with oppositely-facing circumferential shoulders 77, 78, and a cam yoke 79 rides upon the ends of the clutch members between these shoulders. The cam yoke 79 is moved in one direction to separate the clutch members 69, 70, by means of a hand lever 80, pivotally attached to the frame 95 of the machine in a conveniently accessible position, as by means of a bracket 81, and connected to the yoke 79 by means of a link 82. When the hand lever 80 is released the yoke 79 is shifted in the other direction to admit of a closing of the clutch by the spring 76 through the cam engagement between the yoke and the shoulders 78 formed on the movable clutch member 70.

Means are provided for causing the rake-heads 21 and 22 to maintain a constant angular position during the rotation of the reel 17, and for adjusting this angular position of the rake-heads. Preferably a normally stationary eccentric 83 is mounted on the reel shaft 18 for controlling the rotation of the rake-heads 21, 22, in their bearings, as 23, 24, 25, 26, in the ends of the reel arms 19, 20, to maintain the angular position of the rake heads. As most clearly shown in Fig. 8 of the drawings, the eccentric 83 is formed integral with the bushing or sleeve 89 which incloses that part of the reel shaft 18 turning within the bearing block 27, this arrangement providing in effect an elongated hub for the eccentric. A two-armed eccentric strap 84, having its arms 85, 86, connected, respectively, to cranks 87, 88, mounted upon the ends of the rake heads 21, 22, turns about the eccentric 83.

The angular position of the rake teeth 41 is adjusted by angularly adjusting the eccentric 83. A lever-arm 90, formed integral with the eccentric 83, serves for manually turning the eccentric. For securing the eccentric in any angularly adjusted position, a notched quadrant 91 (Fig. 9) is formed on the bearing block 27, and a manually-controlled spring-pawl 92, of ordinary construction, is carried by the lever-arm 90 for playing over the notched quadrant 91.

During the forward movement of the machine the raking reel 17 is rotated from the rotating axle 14 through the intermeshing bevel gears 60 and 61, and the sprocket chain 56. By pulling on the hand-lever 80 the operator may arrest the rotation of the reel 17, for the cam yoke 79 is thus caused to react between the clutch members 69 and 70 to separate them. The reel 17 may be vertically adjusted in the frame 95 to cause the rake teeth 41 to more or less closely approach the ground in their movement about the reel shaft by vertically adjusting the bearing blocks 27, 28, in the supporting brackets 29, 30, through the use of the threaded crank shafts 47, 48. The stripper frame 39 provides means for clearing the rake teeth 41, and inasmuch as this frame is carried by the bearing blocks 27, 28, it always maintains the same vertical position with respect to the rake teeth, no matter what the vertically-adjusted position of the reel may be. The pitch or angle assumed by the rake teeth 41 may be adjusted by turning the eccentric 83 through the use of the lever arm 90, formed thereon, the spring pawl 92 playing over the quadrant 91 formed on the bearing block 27, then serving to maintain the parts in the desired position of adjustment.

I claim as my invention—

1. In a hay rake, in combination, a carrying frame having vertically-extended slideways, a rotatable raking reel, bearing blocks for the ends of the reel shaft adjustably mounted in the vertical slideways of the carrying frame, and a stripper frame for the raking reel secured to the bearing blocks.

2. In a hay rake, in combination, a carrying frame having vertically-extended slideways, a rotatable raking reel, bearing blocks for the ends of the reel shaft mounted in the vertical slideways of the carrying frame, a stripper frame for the raking reel secured to the bearing blocks, and threaded crank shafts journaled in the ends of the slideways and operatively engaging the bearing blocks.

3. In a hay rake, in combination, a carrying frame having vertically-extended slideways, bearing blocks adjustably mounted in the slideways, and a rotatable rake shaft inclined to the line of draft of the carrying frame journaled in the bearing blocks.

4. In a hay rake, in combination, a rotatable raking reel, a carrying frame therefor having vertically-extended slideways, and a stripper frame for the raking reel having its ends adjustably mounted in the slideways of the carrying frame.

5. In a hay rake, in combination, a carrying frame having a rotating wheel axle, a rotatable rake shaft inclined to the axle, a countershaft parallel with the rake shaft, sprocket and chain driving connection between the countershaft and the rake shaft, and bevel gear driving connection between the wheel axle and the countershaft.

6. In a hay rake, in combination, a carrying frame having a rotating wheel axle, a rotatable rake shaft inclined to the axle and mounted for vertical adjustment in the carrying frame, a countershaft parallel with the rake shaft, bevel gear connection between the countershaft and the wheel axle, a sprocket on the countershaft, a sprocket on the rake shaft, and a slack chain turning over the sprockets.

7. In a hay rake, in combination, a carrying frame having a rotating wheel axle, a rotatable rake shaft inclined to the axle, a countershaft parallel with the rake shaft, sprocket and chain driving connection between the countershaft and the rake shaft, a gear loosely mounted on the axle having a clutch face and a circumferential shoulder, operative connection between the gear and the countershaft, a movable clutch member splined to the axle coöperating with the clutch face of the gear and having a circumferential shoulder, a spring bearing on the clutch member for normally holding it in contact with the gear, a cam yoke straddling the axle between the circumferential shoulders on the gear and the clutch member, and a hand lever for shifting the yoke.

8. A rotatable rake member for side delivery hay rakes comprising, in combination, a reel, a rake head journaled in the reel arms, a crank-arm on the rake head, a normally stationary eccentric on the reel shaft, an eccentric strap turning on the eccentric, connection between the eccentric strap and crank-arm of the rake head, and means for adjustably turning the eccentric.

9. A rotatable rake member for side delivery hay rakes comprising, in combination, a reel, a rake head journaled in the reel arms, a crank-arm on the rake head, an eccentric on the reel shaft, an eccentric strap turning on the eccentric, connection between the eccentric strap and the crank-arm of the rake head, a non-rotatable notched quadrant, a lever arm on the eccentric, and a manually-controlled spring pawl carried by the lever arm and playing over the quadrant.

10. A rotatable rake member for side delivery hay rakes comprising, in combination, a reel, a rake head journaled in the reel arms, a crank-arm on the rake head, an eccentric on the reel shaft, an eccentric strap turning on the eccentric, connection between the eccentric strap and the crank-arm of the rake head, a vertically-adjustable bearing block for the reel shaft, a notched quadrant formed on the bearing block, a lever arm for the eccentric, and a manually-controlled spring pawl carried by the lever arm and playing over the quadrant.

11. A rotatable rake member for side delivery hay rakes comprising, in combination, a reel, a rake head journaled in the reel arms, a crank-arm on the rake head, an eccentric on the reel shaft, an eccentric strap turning on the eccentric, connection between the eccentric strap and the crank-arm of the rake head, a vertically-adjustable bearing block for the reel shaft, and coöperating spring pawl and notched quadrant members carried by the eccentric and the bearing block, respectively.

12. A power head for rotatable raking reels comprising, in combination, a rake-guiding eccentric, a hand lever formed on the eccentric, a spring pawl carried by the hand lever, and a toothed quadrant coöperating with the pawl carried by a non-rotatable support.

13. A power head for rotatable raking reels comprising, in combination, a vertically-adjustable reel-supporting bearing block, a rake-guiding eccentric rotatably mounted in the bearing block, a notched quadrant formed on the bearing block, a lever arm formed on the eccentric, and a manually-controlled spring pawl carried by the lever arm and playing over the quadrant.

14. In a side delivery rake in combination, a wheeled carrying frame, a rotatable raking reel carried thereby and inclined to the line of draft of the frame, and means for vertically adjusting the reel in a straight line in the frame.

15. In a rake in combination, a carrying frame, a revolving rake-bar mounted therein, a stripper bar coöperating with the rake-bar, and means for vertically adjusting the stripper bar in a straight line in the carrying frame.

16. In a rake in combination, a carrying frame, a rotatable raking reel mounted therein, a stripper frame coöperating with the reel, and unitary means for vertically adjusting the reel and the stripper frame in a straight line in the carrying frame.

17. In a hay rake, in combination, a carrying frame having a rotating wheel axle, a rotatable rake shaft inclined to the axle mounted for vertical adjustment in the carrying frame, and driving connection between the axle and the rake shaft including a countershaft parallel with the rake shaft fixed in position in the carrying frame.

18. In a hay rake, in combination, a carrying frame having a rotating wheel axle, a rotatable rake shaft inclined to the axle mounted for vertical adjustment in the carrying frame, a countershaft parallel with the rake shaft, sprocket and chain driving connection between the countershaft and the rake shaft, and bevel gear driving connection between the wheel axle and countershaft.

19. In a hay rake, in combination, a carrying frame having a rotating wheel axle, a rotatable rake shaft inclined to the axle mounted for vertical adjustment in the carrying frame, a countershaft parallel with the rake shaft fixed in position in the carrying frame, bevel gear driving connection between the wheel axle and the countershaft, a sprocket on the countershaft, a sprocket on the rake shaft, a slack chain turning over the sprockets, and a yielding slack take-up bearing on the chain between the sprockets.

20. In a side delivery rake, in combination, a wheeled carrying frame, and a rotatable rake shaft inclined to the line of draft of the frame and mounted for vertical adjustment therein adjacent each of its ends.

21. In a side delivery rake, in combination, a wheeled carrying frame, a rotatable raking reel inclined to the line of draft of the frame, and a stripper frame coöperating with the reel, the reel and the stripper frame being mounted for vertical adjustment in the carrying frame adjacent each of their ends.

22. In a side delivery rake, in combination, a wheeled carrying frame, a rotatable raking reel inclined to the line of draft of the frame, a stripper frame coöperating with the reel, and unitary means adjacent each end of the reel for vertically adjusting the reel and the stripper frame in the carrying frame.

23. In a hay rake, in combination, a carrying frame having a rotating wheel axle, a rotatable rake shaft inclined to the axle mounted in the carrying frame and capable of vertical adjustment relative thereto, and driving connection between the axle and the rake shaft including a countershaft fixed in position in the carrying frame.

24. In a side delivery rake, in combination, a wheeled carrying-frame and a rotatable rake shaft inclined to the line of draft of the frame and mounted for vertical movement therein adjacent each of its ends.

25. In a side delivery rake, in combination, a wheeled carrying-frame, a rotatable rake shaft inclined to the line of draft of the frame, and bearing blocks for the ends of the rake shaft mounted for vertical movement in the frame.

26. In a side delivery rake, in combination, a wheeled carrying-frame having vertically extended slideways, a rotatable rake shaft inclined to the line of draft of the frame, and a bearing block for each end of the rake shaft, each of said bearing blocks being movably mounted in one of the vertically extended slideways of the carrying-frame.

ERNEST C. SMITH.

Witnesses:
E. A. HEALD,
CAMELIA KINTZ.